Figure 1:
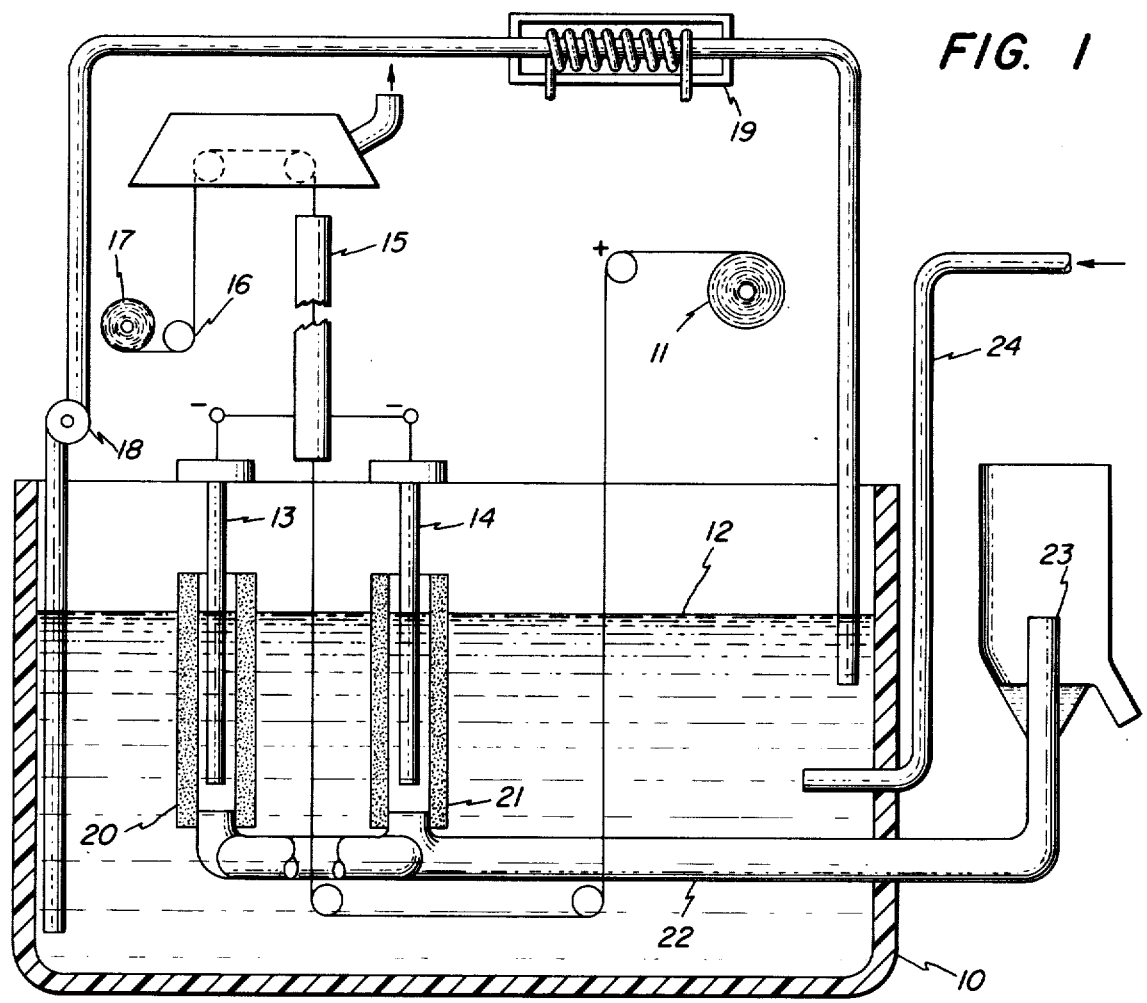

United States Patent [19]

Lupinski et al.

[11] 4,024,046
[45] May 17, 1977

[54] METHOD FOR MAKING POLYIMIDE COATED CONDUCTORS IN A CONTINUOUS MANNER AND PRODUCTS MADE THEREBY

[75] Inventors: John H. Lupinski, Scotia, N.Y.; James M. McQuade, Fort Wayne, Ind.

[73] Assignee: General Electric Company, Schenectady, N.Y.

[22] Filed: June 20, 1975

[21] Appl. No.: 588,637

Related U.S. Application Data

[62] Division of Ser. No. 497,516, Aug. 15, 1974, Pat. No. 3,974,324.

[52] U.S. Cl. .................. 204/300 EC; 204/181; 204/299 EC
[51] Int. Cl.[2] .............. C25D 13/16; C25D 13/06; C25D 13/24
[58] Field of Search ........... 204/181, 300, 299, 301

[56] References Cited

UNITED STATES PATENTS

| | | | |
|---|---|---|---|
| 2,127,413 | 8/1938 | Leguillon | 204/300 X |
| 3,304,250 | 2/1967 | Gilchrist | 204/181 |
| 3,444,066 | 5/1969 | Brewer et al. | 204/181 |
| 3,589,992 | 6/1971 | Kawai et al. | 204/181 |
| 3,616,396 | 10/1971 | Swanson | 204/181 |
| 3,629,087 | 12/1971 | Rubin | 204/181 |
| 3,810,858 | 5/1974 | Boldebuck | 204/181 |
| 3,855,169 | 12/1974 | Lupinski et al. | 204/181 |
| 3,892,647 | 7/1975 | Peterson | 204/181 |

FOREIGN PATENTS OR APPLICATIONS

| | | | |
|---|---|---|---|
| 1,117,461 | 6/1968 | United Kingdom | 204/181 |

*Primary Examiner*—Arthur C. Prescott
*Attorney, Agent, or Firm*—William A. Teoli; Joseph T. Cohen; Jerome C. Squillaro

[57] ABSTRACT

A continuous method is provided for making polyimide coated conductors, such as wire and metal foil, by continuously passing the conductor into an aqueous plural solvent polyamide acid salt electrocoating bath. Electrodeposition can be effected of polyamide acid having sufficient organic solvent to produce a satisfactory polyimide film by passing the polyamide acid treated conductor through a curing tower. The electrocoating bath can be continuously maintained by use of a semi-permeable membrane allowing for continuous plural solvent and base removal, while makeup aqueous plural solvent polyamide acid salt mixture is continuously introduced into the bath. A polyimide coated aluminum foil useful for making transformer windings is also included.

2 Claims, 2 Drawing Figures

U.S. Patent    May 17, 1977    4,024,046

METHOD FOR MAKING POLYIMIDE COATED CONDUCTORS IN A CONTINUOUS MANNER AND PRODUCTS MADE THEREBY

This is a division, of application Ser. No. 497,516, filed Aug. 15, 1974 now U.S. Pat. 3,974,324

Polyimides have long been recognized as superior high temperature insulating materials when utilized as a coating on metal conductors, such as copper wire. Prior to the present invention, as shown for example, by U.S. Pat. Nos. 3,377,310 Serlin et al, 3,277,043, Holub et al, etc. the only known method for coating conductors with polyimides in a continuous manner was by a dip-coating procedure. A "polyamic acid" or as referred to hereinafter, "polyamide acid" was used in a substantially anhydrous organic solvent including a cresylic solvent, as shown by the aforedescribed patents. The conductor was passed into the substantially anhydrous polyamide acid organic solvent solution and thereafter the polyamide acid treated conductor was passed through a curing tower to convert the polyamide acid to the polyimide state.

Although the aforementioned continuous "dip-coating" method provides for valuable insulated conductor, it has many disadvantages. One disadvantage is that a large amount of organic solvent is carried as part of the dip-coat with the polyamide acid coated wire to the curing tower. The solvent has to be eliminated by vaporizing it, or burning it off to the atmosphere resulting in considerable air pollution, or expensive equipment to reduce air pollution. Another disadvantage is the wire must be passed several times, for example, as many as 5 or more times through the dip-coating bath and the curing tower to build up the desired thickness of the polyimide enamel.

Another disadvantage of making polyimide coated conductors by continuous dip-coating is the problem of edge coverage with certain shaped conductors such as square shaped magnet wire, or flat strip, such as aluminum strip. Experience has shown for example, that unlike round wire, which can result in a uniform build after each successive dip-coat, irregular shaped conductors, such as square shaped magnet wire, or metal strip can result in structures having over-build at the center as compared to the edges. A coated strip having over-build at the center as compared to its edge can reduce its turn potential as a coil winding as part of an electrical component in those instances where space is an important consideration.

Attempts have been made to overcome the pollution, film thickness and edge coverage shortcomings of the polyamide acid dip-coating method by the use of various electrodeposition procedures, utilizing aqueous polyamide acid salt mixtures containing a neutralizing base in addition to organic solvent and water, such as those shown in Holub et al U.S. Pat. Nos. 3,537,970 and 3,507,765, assigned to the same assignee as the present invention. Although these patents do not teach how continuous electrocoating of a polyamide acid can be achieved, those skilled in the art of making insulated conductors know that electrocoating can substantially reduce many of the above described dip-coating problems. For example, electrocoating baths can provide reduced pollution over dip-coating baths because the electrocoating bath contains a considerable amount of water in place of organic solvent even though a significant amount of organic solvent must be used. Another advantage provided by electrocoating over dip-coating is electrodeposit often can be carried by the conductor to directly produce up to 1 mil or higher polyimide coating on the conductor after only one pass through the aqueous polyamide salt bath, instead of five passes or more required by various dip-coating methods. A further advantage provided by electrocoating is that irregular shaped conductor, such as aluminum strip or foil can be uniformly coated with polyimide so excessive over-build is avoided at the middle to insure adequate edge coverage. The strip uniformly coated with polyimide can be advantageously used in various insulating applications to provide maximum turn potential while occupying less space.

Although electrocoating offers many significant advantages over dip-coating, those skilled in the art know that in order to electrocoat in a continuous manner, procedures have to be adopted to continuously remove solvent and base from the bath at the same rate electrodeposited polymer is removed from the bath by the substrate. In order to satisfactorily electrocoat a conducting substrate with polyamide acid in a continuous manner, the bath must be continuously maintained during the time the conductor, which serves as one of the electrodes, is passed into the bath and out of the bath. The continuous maintenance of a polyamide acid salt bath is complicated by the fact that the polyamide acid requires an aqueous plural solvent bath having a significant amount of organic solvent, in addition to water and neutralizing base. The presence of organic solvent in the electrodeposit is mandatory. While passing through a curing tower, the electrodeposited polyamide acid must contain a sufficient amount of organic solvent to insure the production of a film during its conversion from the polyamide acid state to the polyimide state. Experience has shown unless the electrodeposit contains a sufficient amount of organic solvent, the polyamide acid will not form a satisfactory insulating film. It may form a useless film having a variety of pin-holes or it even can convert to a powder.

Gilchrist et al patent 3,304,250, and British Pat. No. 1,117,461 show successful bath maintenance can be achieved under continuous electrocoating conditions with certain aqueous organic resin compositions, such as glyceride curing or semicuring oils coupled with an aliphatically unsaturated carboxylic acid. Because cure of such electrodeposited organic resins to a film on the electroconducting substrate does not require the presence of organic solvent in the electrodeposit, the electrocoating bath can be free of organic solvent. Continuous electrocoating bath maintenance is achieved by Gilchrist by the use of a semi-permeable membrane. Aqueous replenishment electrocoating mixture is continuously fed into the bath. Build-up of base is overcome by electrodialysis and the cathode compartment is periodically or continuously flushed.

Experience has shown, the application of a semipermeable membrane to a polyamide acid salt bath to achieve continous bath maintenance presents an entirely different problem than shown by prior art electrocoating methods. Prior to the present invention, for example, it was not feasible to achieve continuous bath maintenance with a semi-permeable membrane in a plural solvent electrocoating bath, as shown for example by Holub et al U.S. Pat. No. 3,537,970, assigned to the same assignee as the present invention. Efforts to achieve continuous bath maintenance under continuous electrocoating conditions with a phenol-water plural solvent electrocoating mixture have been unsuccessful because the electroosmotic pressure generated across the membrane wall is insufficient to effect plural solvent transport. Some degree of success has been achieved in continuously electrocoating a conducting substrate with the aforementioned aqueous plural solvent polyamide acid salt bath by effecting removal of solvent and base through evaporation. Even though many advantages can be achieved by manufacturing polyimide enameled conductor in a continuous manner by the aforementioned electrocoating method, evaporation of the base and aqueous plural solvent does not overcome the problem of atmospheric pollution.

The present invention is based on the discovery that certain water miscible aprotic solvents, as defined hereinafter, can be employed with water to provide a plural aqueous solvent medium for polyamide acid salt, which plural aqueous solvent medium can be satisfactorily transported through a semi-permeable membrane. Transport through a semi-permeable membrane is achieved without substantial alteration of bath composition under continuous electrocoating conditions. In addition, the water miscible aprotic solvent referred to hereinafter as "aprotic organic solvent" can provide sufficient organic solvent in the elctrodeposit to produce a satisfactory polyimide insulating coating. Continuous bath maintenance can be achieved by subjecting the bath to a voltage sufficient to at least maintain an apparent current density of about 4 amp/per sq foot. A sufficient electroosmotic pressure can be achieved to effect plural solvent and base transport through a semipermeable membrane and provide electrodeposition of polyamide acid on conducting substrate under continuous electrocoating conditions. This discovery is quite surprising, in view of the considerable dissimilarity between water and such aprotic organic solvent, such as basicity, chemical composition, etc.

There is provided by the present invention, a continuous method for coating electrical conductors with polyimide enamel by continuously passing the conductor into an organic solvent bath of a polyamide acid followed by passing the resulting polyamide acid treated conductor through a curing tower whereby there is effected separation of organic solvent from polyamide acid and the conversion of polyamide acid to the polyimide state, which is based on the improvement comprising continuously passing the electrical conductor into an electrocoating bath having at least one other electrode at a different electrical potential than said conductor to provide for a direct current flow of electrical energy between said conductor and other electrode through said bath and electrodeposition of polyamide acid onto said conductor from said electrocoating bath, which is being continuously maintained in the form of an aqueous plural solvent polyamide acid base mixture having from about 0.05 to about 1.0 meq of base per gram of polymer selected from the class consisting of, A. an aqueous dispersion of a particulated polyamide acid comprising,
  a. particulated polyamide acid having less than 25ppm of titratable chloride, and
  b. an aqueous plural solvent containing as essential ingredients (i) water and (ii) aprotic organic solvent, where the ratio of (i/ii) can have a value of from 3.75 to 1.0,
where (a) is present by weight in said aqueous dispersion in the range of from 2 to 15% based on the weight of a and b, and B. an aqueous polyamide acid base mixture comprising,
  d. polyamide acid, and
  e. an aqueous plural solvent containing as essential ingredients (iii) water and (iv) aprotic organic solvent, where the ratio of (iii/iv) can have a value of from 0.5 to 3.75, and (d) is present in said mixture in the range of from 2 to 15% based on weight of (d) and (e).

A more complete understanding of the method of the present invention can be obtained by reference to FIG. 1, showing the passage of an electroconductor in the form of round or square wire or flat strip into a polyamide acid salt bath, between two semi-permeable membrane enclosed electrodes, and its passage from the bath to a curing tower. Means for introducing replenishment polyamide acid mixture into the bath, and its removal from the cathode compartment in a continuous manner are also shown.

Figure 2:
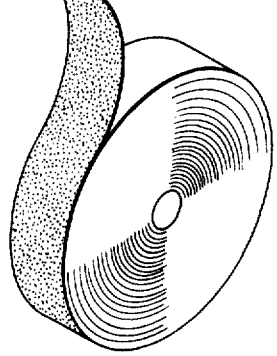

FIG. 2 is a drawing in perspective of a polyimide coated metal strip which can be made by the practice of the invention.

Some of the polyimide acids which can be electrodeposited in accordance with the practice of the invention are shown by Holub U.S. Pat. No. 3,507,765, assigned to the same assignee as the present invention. There are included for example, polyamide acids in the form of reaction products of at least one organic dianhydride, such as benzphenone dianhydride, pyromellitic dianhydride, ethylene glycol bistrimellitate anhydride, etc, with at least one organic diamine, for example, meta-phenylene diamine, 4,4'-methylene dianiline, 4,4'-oxydianiline, and optionally with one or more various aliphatic diamines, such as hexamethylene diamine, 1,3-propane diamine, etc. When utilized in the practice of the present invention, polyamide acids which are formed from the aforementioned reactants can be made by dissolving the reactants in an organic solvent, which can be the aprotic organic solvent utilized in the polyamide acid salt bath referred to above. A base can then be added to the resulting organic solvent solution of the resulting polyamide acid reaction product prior to the addition of water to form the polyamide acid salt. Any one of a variety of bases can be utilized as will be more particularly defined hereinafter.

One of the preferred polyamide acid salt bath compositions is described in copending application now U.S. Pat. No. 3,855,169 of John Lupinski et al, filed concurrently herewith and assgined to the same assignee as the present invention. As shown by Lupinski et al, optimum electrocoating results can be achieved in a continuous manner by utilizing a polyamide acid salt bath in the form of an aqueous dispersion of a particulated polyamide acid formed from the reaction of chloroformylphthalic anhydride and an organic diamine, such as methylene dianiline. As taught by Lupinski et al, the aforementioned reaction product, in the form of an aqueous dispersion of a particulated polyamide acid having less than about 25 parts per million of titratable chloride based on weight of polyamide acid is employed in combination with the aprotic organic solvent used in the subject invention with an organic amine, for example methanol amine or ammonia. A desirable characteristic of this polyamide acid salt composition is the particulated form of the polyamide acid which forms the dispersed phase having an average particle size of more than about 20 microns. Plural solvent transport through a semi-permeable membrane is facilitated because the solvent phase is substantially free of dissolved polymer. In addition, solvent run-off from electrodeposited polyamide acid during cure is minimized. Organic diamines, $NH_2RNH_2$, can be employed to make the finely divided polyamide utilized in the above described copending application of Lupinski et al, where R is selected from a divalent aromatic hydrocarbon radical having from 6 to 18 carbon atoms, and $R^1QR^1$, $R^1$ is a divalent aromatic hydrocarbon radical included by R and Q is a member selected from O,

$C_{(2-8)}$ alkylene, Si and S.

Radicals included by R and $R^1$ are for example, p-phenylene, m-phenylene, etc.; xylylene, tolylene, naphthylene, anthrylene, etc. In addition R can be

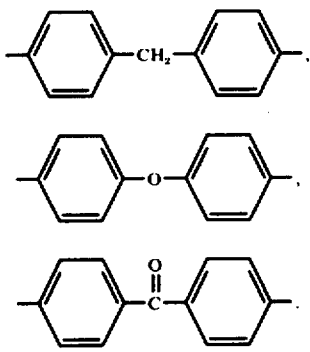

Another variety of polyamide acid salt, which can be advantageously utilized in the practice of the continuous electrocoating method ot the present invention, is shown by E. Boldebuck in copendng application Ser. No. 148,154, filed May 28, 1972 and assigned to the same assignee as the present invention. These aqueous polyamide acid salt compositions are substantially free of unneutralized carboxy radicals and have from about 0.05 to about 1 meq of polyamide acid salt radicals per gram of polymer. These polyamide acid salt compositions possess superior shelf life stability and a high coulomb yield, and are ideally suited for continuous electrocoating procedures. As defined herein for purposes of describing the essential features of the present invention, "coulomb yield" signifies the weight of polyamide acid deposited on an electroconducting substrate, per coulomb of current utilized during electrocoating. Bath stability is shown after a shelf period of at least 3 months or more at temperatures of up to 45° C without a significant change taking place in the nature of the polyamide acid salt bath, which can be measured by the weight percent of polyamide acid in the wet electrodeposit.

Included by aprotic organic solvents which can be employed in the practice of the present invention, are for example, N,N-dimethylformamide, N,N-dimethylacetamide, N,N-diethylformamide, N,N-diethylacetamide, N,N-diethylmethoxy acetamide, N-methyl caprolactam, dimethylsulfoxide, N-methyl-2-pyrrolidone, tetramethylurea, pyridine, dimethylsulfone, tetramethylene sulfone, N-methylformamide, N-acetyl-2-pyrrolidone, etc.

Some of the bases which can be utilized in the practice of the present invention to at least partially neutralize the polyamide acid are for example, ammonia, ammonium hydroxide, N-methyl morpholine, pyridine, dimethylethanolamine, triethanolamine, primary and secondary aliphatic amines containing up to 4 carbon atoms, such as methylamine, ethylamine, secondary butylamine, isopropylamine, dimethylamine, diethylamine, dibutylamine, etc. Stronger organic and inorganic bases, as well as alkali metal compounds can be employed. For example, tetraalkylammonium hydroxides and alkali metal hydroxides included by MOH, where M is a member selected from alkali metal ions and tetraorgano ammonium ions. IN instances where M is alkali metal, M also can be chemically combined with -OG radicals, where G is selected from alkyl radicals and aryl radicals. Included by the bases which can be employed are for example, alkali metal hydroxides, such as sodium, potassium, lithium, etc.; tetraalkyl ammonium hydroxides, such as tetramethyl, tetrabutyl, etc., alkoxides, such as sodium methoxide, potassium ethoxide, etc., phenoxides, such as sodium phenoxides, potassium phenoxides, lithium phenoxides, etc. In addition, organic bases such as guanadine, etc.

Further examples, of polyamide acids which can be employed in the practice of the method of the present invention, are described in the aforementioned copending application of E. Boldebuck. These polyamide acids can be derived from polyimides, having imide functionality in the polymer backbone or in the pendant position. For example, such polyimides as poly(aspartimide), poly(amideimide), poly(amideacidimide), poly(esterimide), etc. can be converted to polyamide acid salts following the Boldebuck technique which comprises adding a strong base to the polyimide at a temperature up to 150° C, while the polyimide is substantially dissolved in a solvent comprising an inert aprotic organic solvent, with a base characterized by having an ionization constant greater than $10^{-2}$ in water at 25° C and is employed in the resulting mixture at a concentration which is at least sufficient to neutralize any carboxy radicals which may be present and provide a ratio of moles of base, per mole of imide functionality of the polyimide having a value of from about 0.01 to about 1.2.

As shown in copending application of William A. Fessler, (RD-5002) filed concurrently herewith and assigned to the same assignee as the present invention, the above described Boldebuck technique can be employed to convert to valuable electrocoating compositions, polyamideimides, resulting from the reaction of two moles of trimellitic anhydride, per mole of organic diamine as defined above, such as methylene dianiline, followed by contacting the resulting bis (N-4-carboxyphthalimido)organo reaction product with organo diisocyanate, $R^2$ $(N=C=O)_2$, where $R^2$ is a divalent arylene radical having from 6-18 carbon atoms. Included by the organodiisocyanate which can be employed are for example, tolylene diisocyanate, or a commercially available isomer mixture of 2,4 and 2,6-tolylene diisocyanate, 4,4'-diphenylmethane diisocyanate, etc.

In addition to the aforedescribed polyimide there also can be utilized for conversion to polyamide acids by the aforedescribed technique, polyimides containing functional units or polymeric blocks of organosiloxane, polycarbonate, polysulfone, polyurethane, etc., substituted with radicals such as organo silyl, alkoxy, etc. Additional examples of polyimides which can be converted to polyamide acid salts which can be utilized in the method of the present invention, include polymers shown in Edward's U.S. Pat. Nos. 2,710,853; 2,867,609, and 3,179,634. Additional examples of the aforementioned polyimides are shown in U.S. Pat. 3,179,635; 3,264,250; 3,493,540; 3,536,670, and 3,562,223, etc.; polyimides shown in patents assigned to the same assignee as the present invention, such as Holub U.S. Pat. No. 3,325,450, Loncrini, U.S. Pat. No. 3,360,502, etc. also can be employed.

Some of the preferred polyimides which can be converted to polyamide acid salt and used in the practice of the method of the present invention can have chemically combined units, such as

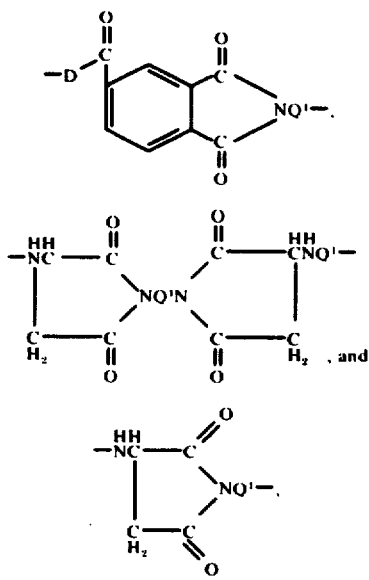

where $Q^1$ is a divalent organo radical free of aliphatic unsaturation, such as arylene, alkylene, and radicals such as $-R_3OR^3-$,

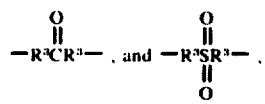

$R^3$ is a divalent hydrocarbon radical and D is a member selected from —O— and

Polyimides having units of formula (2), or a mixture of formula (2) and (3) units, can be made of effecting reaction between organic diamines as defined above and maleic anhydride, as taught in Ger Offen 1,962,845, June 18, 1970. In addition, polyimides having units of formula (1) can be made by a method of S. Terney, J. Keating and J. Zielinski, Journal of Polymer Science, P. 686, Vol. 8, (1970) by effecting reaction between diphenylmethane diisocyanate and trimellitic anhydride in N-methylpyrrolidone.

In addition to the above described polyimides, further examples of polyimides which can be converted to polyamide acids or polyamide acid salts and utilized in the method of the present invention or can be made by the method shown by Klebe and Windish, copending application Ser. No. 838,322, filed July 1, 1969, now abandoned and assigned to the same assignee as the present invention. As described by Klebe et al, various aromatic carbocyclic organic polymers, such as polystyrene, polyaryleneoxide, polycarbonate, polyester, can be imido alkylated with an imido alkylating agent of the formula,

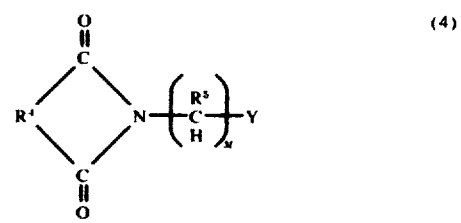

where $R^4$ is a divalent organic radical selected from the class consisting of divalent hydrocarbon radicals and halogenated divalent hydrocarbon radicals, and $R^5$ is selected from hydrogen, monovalent hydrocarbon radicals, and halogenated monovalent hydrocarbon radicals, Y is a halogen or hydroxy radical, and $m$ is an integer having a value of from 1 to 4 inclusive.

Radicals included by $R^4$ are for example, arylene radicals, such as phenylene, biphenylene, naphthylene, anthrylene, etc., alkylene radicals, such as ehtylene, trimethylene, tetramethylene, etc.. halogenated arylene and alkylene radicals, such as chlorophenylene, chloronaphthylene, chloroethylene, chlorotrimethylene, etc.; aliphatically unsaturated radicals, such as

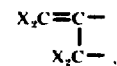
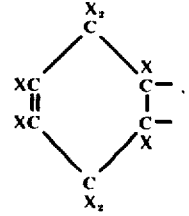
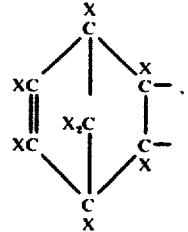

where X is the same or different radical selected from hydrogen, lower alkyl, halogen, such as chloro, methyl, ethyl, propyl, bromo, etc. Monovalent and hydrocarbon radicals included by $R^5$ are, for example, phenyl, chlorophenyl, methyl, ethyl, propyl, butyl, pentyl, hexyl, heptyl, octyl, etc.

As taught in the above identified application of Klebe and Windish, a Friedel Crafts catalyst, such as boron trifluoride is employed to imidoalkylate various aromatic carbocyclic organic polymers as previously defined. These polyimides have aromatic carbocyclic radicals occurring in either the pendant position, such as polystyrene, or the polymer backbone, such as polyaryleneoxide, polycarbonate, polyester, etc., substituted with imidoalkyl radicals of the formula,

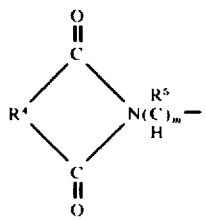
(5)

where $R^4$, $R^5$ and m are as previously defined. Included among the imidoalkyl substituted aromatic carbocyclic polymers having imidoalkyl radicals of formula (5) are organic polymers selected from "backbone" polymers of the formula,

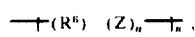
(6)

and "pendant" polymers of the formula,

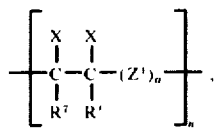
(7)

where $R^6$ is a polyvalent organo radical, such as an aromatic carbocyclic radical having from 6 to 18 carbon atoms, $R^7$ is a monovalent aromatic carbocyclic radical having from 6 to 18 carbon atoms, X is as previously defined, Z and Z' are divalent organo connectives defined below, a is a whole number equal to 0 or 1, and n is an integer having a value of from 1 to 1,000 inclusive.

Radicals included by $R^6$ of Formula 6 are phenylene, tolylene, xylylene, naphthylene, anthrylene, etc.; halogenated derivatives of such aromatic carbocyclic radicals, alkylated derivatives of such aromatic carbocyclic radicals; a mixture of such aromatic carbocyclic radicals, or derivatives of such aromatic carbocyclic radicals, and other polyvalent hydrocarbon radicals or halogenated polyvalent hydrocarbon radicals, which mixture contains at least about 1 percent and preferably about 10 mole percent to 99 mole precent of such aromatic carbocyclic radicals or derivatives thereof and up to 99 mole percent, and preferably up to about 90 mole percent of divalent radicals such as alkylene radicals, for example, methylene, ehtylene, trimethylene, etc., halogenated derivatives thereof, etc.

Radicals included by $R^7$ of formula (7) are, for example, phenyl, tolyl, xylyl, naphthyl, anthryl, etc.; halogenated derivatives of such monovalent aromatic carbocyclic radicals; alkylated derivatives of such monovalent carbocyclis radicals; a mixture of such aromatic carbocyclic radicals, and other monovalent hydrocarbon radicals or halogenated hydrocarbon radicals, which mixture contains at least about 1 mole percent and preferably 10 mole percent to 99 mole percent of such aromatic carbocyclis radicals, or derivatives thereof, and up to about 99 mole percent and preferably up to 90 mole percent of monovalent radicals such as alkyl radicals, for example, methyl, ethyl, propyl, butyl, etc.; halogenated derivatives thereof, etc. In Formula (6), Z is a polyvalent organo connective such as,

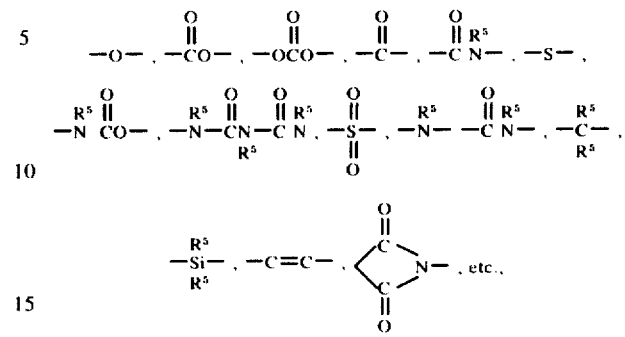

and mixtures thereof, $Z^1$ in Formula 7 is a divalent organo connective, such as

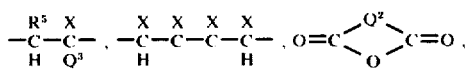

etc., $Q^2$ is a polyvalent aliphatic radical, and $Q^3$ can be nitrile.

In the practice of the method of the invention, one or more electroconductors, for example copper or aluminum wire having AWG size of from 8-52, aluminum strip, magnet wire, aluminum foil, etc. is unwound from roller 11, and passed into the polyamide acid salt bath at 12 contained in tank 10, between cathodes 13 and 14 and up through curing tower 15, the cured strip is wound on roller 17 after being actuated by driver 16 in a uniform manner. As used hereinafter, the term "foil" signifies a structure having a thickness of 0.2 to 7 mil, while strip has a thickness greater than 7 mil.

The power supply not shown can be varied between 50 to 350 volts depending upon the speed of the conductor through the bath, the thickness of the polyamide acid film on the surface of the electroconductor, the number of electroconductors coated at one time, etc.

Agitation and temperature control of the bath is achieved with pump 18 and cooling coil 19. Semipermeable membranes 20 and 21, each of which can represent one of a series to provide uniform base and plural solvent transport to respective cathode compartments. Cathode compartments contain cathode elements 13 and 14, which also individually can represent one of a series to provide a more uniform current density in the bath to effect a more even electrodeposition on one or more electroconducting substrates. In addition, solvent and base removal means are situated at the bottom of each membrane which have a common connecting means 22 to overflow tube 23.

Depending upon such factors as the speed of the electroconductor through the bath, the applied voltage, the type of semi-permeable membrane, etc., the rate at which solvent and base removal can be achieved when overflow flow occurs at 23, as a result of electroosmatic pressure causing an increase in level within the cathode compartment over the height of level 12, can vary widely.

Replenishment of the bath is achieved through duct 24 which is joined to a make-up polyamide acid reservoir not shown. The solids concentration of the make-up solution can be varied to offset the difference in rate at which the solids are electrodeposited out of the bath and the aqueous solvent and base are transported through the membrane by electroosmosis and electrodialysis.

Although a wide variety of semi-permeable membranes can be employed in the apparatus of the invention as shown by FIG. 1, it is preferred to employ ceramic membranes, for example, porous alpha alumina having an average pore size of from 10 microns to 100 microns and preferably 20 to 60 microns. Glass filters can also be employed.

Temperature of the bath can be in the range of from 5° to 60° C. Temperature of the curing tower can vary between 40° C to 450° C. A gradual increase in the temperature is maintained to avoid premature flashing off of solvent by dividing the curing tower into a number of heating zones.

A significant advantage achieved with the apparatus shown by FIG. 1 is that solvent and base collected from over-flow tube 23 can be recycled to produce more electrocoating mixture.

Polyimide coated foil or strip, as shown in FIG. 2, also are provided by the present invention. For example, aluminum strip. 25 mils × 2 inches to 30 mils × 6 inches having polyimide film thickness of 2 to 1 mils can be made singly, or simultaneously depending upon the number of cathodes employed and size of curing tower. The coated strip is pinhole free on edges and free of over-build at the center. As a result voltages of up to 1K-V can be employed across the film surface without breakdown occuring.

In order that those skilled in the art will be better able to practice the invention the following examples are given by way of illustration and not by way of limitation. All parts are by weight.

EXAMPLE 1

A mixture of 900 parts of chloroformylphthalic anhydride and 864 parts of methylene dianiline are throughly mixed. There is added to the mixture, a mixture of 2,100 parts of N-methyl pyrrolidone and 432 parts of triethylamine while the resulting mixture is vigorously stirred. As the mixture is stirred the temperature rises to about 90° C. The mixture is stirred for an additional hour and a solution forms which is allowed to cool to about 50°. There is then added an additional 370 parts of N-methylpyrrolidone in 1,240 parts of xylene. After standing overnight the solution is filtered to remove triethylaminehydrochloride. The resulting mixture is thereafter poured into excess methanol resulting in the precipitation of a finely divided polyamide acid.

A mixture of 500 parts of the above described finely divided polyamide acid and 1,500 parts of water was placed in a container with ceramic balls. The container was put into a rolling mill for 16–20 hours and the containers rotated at 60 revolutions per minute. The mixture was then poured into another container and the ceramic balls were washed and the washings were combined with the original mixture. The resulting mixture was then filtered using a 25–50 micron fritted glass filter. The filtrate was then discarded and a fresh amount of distilled water was added to the residue on the filter and the mixing procedure was repeated 3 more times. After three washings there was obtained a mixture of 80 parts of washed polyamide acid solids having less than about 25 ppm of chloride based on the weight of dry solids. The solids were combined with 2,000 parts of water and 120 parts of a 50% mixture of triethanol amine and water and about 12 parts of an aqueous dispersion in a 10% aqueous solution of a polymerized aryl sulfonic acid salt. The resulting mixture was then roll milled as described above for about 12 hours. There was then added to the resulting dispersion, additional water, N-methylpyrrolidone, triethanolamine and the aforementioned dispersing 7½to produce a final aqueous dispersion having by weight 7 % solids in the dispersed phase with an average particle size between 20 to 100 microns, 67% water, about 24% of N-methylpyrrolidone and about 1½% of triethanolamine. The pH of the resulting dispersion was about 7.2.

The above electrocoating mixture was poured into a tank similar to one shown in FIG. 1, having the various parts of the apparatus including an aluminum foil having a thickness of 1 mil and a width of 2 inches and ceramic membranes ½ ID × ¾ OD × 6 inches long in the form of alumina tubes manufactured by Norton Company having an average porosity of about 35%. A voltage of 150–175 volts was utilized during the electrocoating providing for a current flow of between about 2.2–3.3 amps utilizing a foil speed of 30–45 inches per minute. During electrocoating, a bath temperature of 35°-45° was maintained. The mixture was continuously electrocoated for a period of 5 hours during which time cathode effluent was continuously separated having a composition of about 25% N-methylpyrrolidone and 73% water and a pH of about 9-10. Upon leaving the electrocoating bath prior to cure, the electrodeposit was found to consist of by weight about 23–31% solids, about 50% water and about 19 to 20% N-methylpyrrolidone.

Depending upon the linear speed of the aluminum foil having the polyamide acid electrodeposit, the residence time in the curing tower varied from about 1 minuteto about 4½ minutes. The curing tower was about 5 feet in height, and had a lower zone with a temperature maintained in the range of 150°–160° C, a center zone maintained at a temperature of 170°–220° C, and a top zone maintained at a temperature between about 250°–270° C. This division in the curing tower allowed for the gradual removal of water of reaction and a more uniform cure of the electrodeposit to the polyimide state. There was obtained a polyimide film-aluminum composite exhibiting valuable insulating characteristics. The polyimide film was found to be uniformly distributed on the edges and on the upper and lower foil surfaces; there was no evidence of over-build. The thickness of the polyimide coating was approximately 0.4 mil.

The above procedure was repeated except that there was employed a polyamide acid base mixture having only about 10% by weight of n-methylpyrrolidone based on the total weight of the bath. This level of aprotic organic solvent was below the weight percent defined above. A cure of the electrodeposited polyamide acid was effected in the same way as described above. The resulting polyimide film-aluminum composite was examined under a microscope; it was found that the surface of the film had a variety of cracks.

Equal lengths of the polyimide coated aluminum strip made by the invention and from the polyamide acid salt bath containing only 10% N-methylpyrrolidone are employed as electrodes in a dilute solution of sodium chloride. A considerable amount of bubbling is noticed on the coated surface of the strip made by using a polyamide acid salt bath by the above described procedure having 10% by weight of N-methylpyrrolidone, the polyimide coated strip made in accordance with the invention is free of bubbles indicating the surface has no pinholes.

EXAMPLE 2

An electrocoating composition was prepared by initially adding 50 parts of an anion-exchange resin Rexyn 203 (OH) obtained from the Fisher Scientific Company, to a 15% solution of the polyamideimide of Example 1 in N-methylpyrrolidone. The polyamideimide utilized was approximately 50% imidized and was derived from the reaction of equal molar amounts of methylene dianiline and chloroformylphthalic anhydride. The resulting mixture was stirred for about 2 hours. The mixture was then filtered through a medium porosity polyethylene filter funnel. There was obtained a solution of the polyamideimide in N-methylpyrrolidone having no more than about 1 part per million of titratable chloride. There was then added to the solution, an additional amount of N-methylpyrrolidone and a sufficient quantity of triethanol amine to produce a solution having an average of about 0.8 meq of amine per gram of polymer. There are then added to the resulting mixture, sufficient water to provide for an electrocoating solution having about 5% of polyamideimide, 25% of N-methylpyrrolidone and 70% by weight of water.

Following the procedure of Example 1, the electrocoating solution was added to the apparatus of FIG. 1 and a 2 × 1 mil aluminum foil was employed to produce a polyimide aluminum composite strip having an average polyimide coating thickness of 0.35 mil. The aluminum strip was found to be uniformly coated with the polyimide film, and free of over-build. It had an average break-down voltage of 1.4KV volts.

EXAMPLE 3

There was added 76.85 parts of trimellitic anhydride to a solution containing 39.65 parts of methylene dianiline dissolved in 255 parts of N-methylpyrrolidone to produce a solution having a mole ratio of trimellitic anhydride to methylene dianiline of 2 to 1. The mixture was cooled in an ice bath and the contents were stirred for 3 hours. The solution was then allowed to warm to room temperature and 50 parts of xylene and 0.1 part of triphenylphosphate were added. This solution was then heated to reflux for 10 hours. Water was evolved and collected. A sample of the solution was removed and titrated with a standard base solution in accordance with known procedures. Based on 1.014 meq of carboxy per gram of solution, the product was 4,4'-bis (N-4-carboxyphthalimido) diphenylmethane.

There was added to 128.32 parts of the abovedescribed bis(N-4-carboxyphthalimido) diphenylmethane, 11.33 parts, in the form of a 20% solution in N-methylpyrrolidone, of an isomeric mixture of toluene diisocyanate. A mixture was formed having substantially equal meq of carboxy and isocyanate. The addition of the toluene diisocyanate was performed in a drop wise manner over a period of 1 hour starting at a temperature of 110° C. The temperature was then increased to 160° C and maintained for 1 hour after the addition had been completed. The mixture was then allowed to cool to room temperature. There was obtained a viscous red-brown solution.

There was added drop wise over a period of 1 hour to the above described polyamideimide-N-methylpyrrolidone solution with stirring, a 1N sodium hydroxide solution to produce a final composition having about 0.8 meq of sodium hydroxide, per gram of polyamideimide. The final electrocoating composition also contained 5% solids and a proportion of 2 parts of N-methylpyrrolidone per part of water. A replenishment solution containing 7.5% solids was also prepared following the same procedure.

Utilizing a 2 wide aluminum foil in the apparatus of FIG. 1, a foil speed of approximately 1 ½ feet per minute and a current of approximately 1.8 amps, there was obtained a cured polyimide aluminum composite foil having a polyimide film thickness of 0.8 mil. During a period of 3 ¾ hours of continuous electrocoating, there was employed 3,800 parts of the 7 ½% make up mixture, there was collected 1,985 parts of solvent and base from the overflow tube derived from the cathode compartment. During the electrocoating of the aluminum foil, the bath composition remained constant at about 5% solids and the amount of sodium hydroxide in the bath was sufficient to maintain the meq of base per gram of polymer solids substantially constant.

EXAMPLE 4

A polyamide acid is prepared by effecting reaction between equal molar amounts of benzophenone dianhydride and methylene dianiline in N-methylpyrrolidone. There is added with stirring to 100 parts of a 16.7% solution in N-methylpyrrolidone, an additional 69 parts of N-methylpyrrolidone, 154 parts of water and sufficient ammonium hydroxide to provide a polyamide acid dispersion having from 0.05 to about 1 meq of base per gram of polyamide acid.

Utilizing the apparatus of FIG. 1, the polyamide acid dispersion is electrocoated employing rectangular copper wire 1/6 inch thick by 6/32 inch wide at a wire speed of 7.5 feet per minute. A 0–300 volt DC power supply is employed to maintain a current density during the electrocoating of 9.5 amps per square foot, between electrodes 13 and 14, as shown in FIG. 1. Polyamide acid is electrodeposited on the wire to provide for a film build of as high as 2 mils upon cure. During the 3 hour electrocoating period, the pH of the mixture remains substantially constant as a result of removal of the ammonium hydroxide and aqueous solvent in a continuous manner, while make up polyamide acid dispersion is continuously introduced.

The coated wire was found to have a shot box dielectric of 1,200 volts after the coated wire has been elongated 25% employing a 1 × mandril wrap.

The above procedure is repeated with a polyamide acid solution having approximately the same composition as above, with phenol in place of N-methylpyrrolidone and sufficient ammonium hydroxide to produce a homogeneous mixture. The phenol containing composition is shown in Holub et al U.S. Pat. No. 3,537,970, assigned to the same assignee as the present invention. The phenol containing polyamide acid mixture is empolyed to make polyimide coated aluminum strip over a period of 1 hour. However, there is no solvent transport observed through the semi-permeable membrane over the entire period indicating a lack of electroosmotic pressure. As a result it is not possible to electrocoat the aluminum strip in a continuous manner using the apparatus of FIG. 1.

A polyamide acid mixture as described above is electrocoated utilizing as the organic solvent, a mixture of two parts of N-methylpyrrolidone per part of phenol. It is found that the resulting mixture can not be employed in the apparatus of FIG. 1 because there is no solvent transport through the membrane.

Although the above examples are limited to only a few of the very many variables which can be employed in the practice of the invention, it should be understood that the present invention is directed to the use of a much broader class of polyamide acids which can be electrocoated in a continuous manner using a wider variety of conditions, solvents, bases, etc. In addition, a wide variety of polyamide coated foil or strip can also be made by such method.

What we claim as new and desire to secure by Letters Patent of the United States is:

1. An apparatus for continuously effecting the electrodeposition of a polyamide acid onto a continuously moving electroconducting substrate comprising,
   A. a tank for containing polyamide acid electrocoating mixture
   B. an anode comprising:
      1. electroconducting substrate
      2. means for continuously conveying said electroconducting substrate into and out of said tank at a substantially uniform rate, while effecting contact with said electrocoating mixture
   C. a cathode compartment comprising:
      1. at least 1 semi-permeable membrane
         a. said semi-permeable membrane allowing for solvent and base transfer from said electrocoating mixture into said cathode compartment through the wall of said semipermeable membrane, while resisting the flow of said polyamide acid into said cathode compartment
      2. cathode disposed within said semipermeable membrane
      3. a solvent and base removal means
         a. said solvent and base removal means being impermeable to said electrocoating mixture and integrally joining said semi-permeable membrane to an overflow tube at the exterior of said tank of (A) permitting the automatic removal of solvent and base from the interior of said cathode compartment, whenever the level of liquid within said cathode compartment exceeds the overflow level of said exterior overflow tube,
   D. means for introducing make up polyamide acid mixture into the tank
   E. a thermal control means for maintaining the temperature of the bath
   F. a curing tower for converting electrodeposited polyamide acid in said continuously moving conductor to the polyimide state.

2. The apparatus of claim 1, where the semipermeable membrane is a ceramic membrane.

* * * * *